United States Patent
Douglass

(10) Patent No.: US 10,029,145 B2
(45) Date of Patent: Jul. 24, 2018

(54) EXERCISE DEVICE WITH A TRAMPOLINE SURFACE AND A RIGID SURFACE

(71) Applicant: ICON Health & Fitness, Inc., Logan, UT (US)

(72) Inventor: Melanie Douglass, Newton, UT (US)

(*) Notice: Subject to any disclaimer, the term of this patent is extended or adjusted under 35 U.S.C. 154(b) by 0 days.

(21) Appl. No.: 15/098,995

(22) Filed: Apr. 14, 2016

(65) Prior Publication Data
US 2016/0303422 A1  Oct. 20, 2016

Related U.S. Application Data

(60) Provisional application No. 62/149,366, filed on Apr. 17, 2015.

(51) Int. Cl.
*A63B 21/00* (2006.01)
*A63B 21/02* (2006.01)
(Continued)

(52) U.S. Cl.
CPC ............ *A63B 23/0405* (2013.01); *A63B 5/11* (2013.01); *A63B 21/4033* (2015.10);
(Continued)

(58) Field of Classification Search
CPC .... A63B 5/00; A63B 5/08; A63B 5/11; A63B 2005/085; A63B 6/00; A63B 21/00047; A63B 21/00058; A63B 21/00061; A63B 21/00065; A63B 21/00178; A63B 21/00181; A63B 21/00185; A63B 21/002; A63B 21/0023; A63B 21/02; A63B 21/023; A63B 21/025; A63B 21/04; A63B 21/0407; A63B 21/0414; A63B 21/0421; A63B 21/0428; A63B 21/0435; A63B 21/0442; A63B 21/055; A63B 21/0552; A63B 21/0555; A63B 21/0557; A63B 21/068; A63B 21/15; A63B 21/151; A63B 21/4027; A63B 21/4029; A63B 21/4033; A63B 21/4034; A63B 21/4037; A63B 22/0046; A63B 22/14; A63B 23/035;
(Continued)

(56) References Cited

U.S. PATENT DOCUMENTS 2,324,970 A  7/1943  Woolley
3,310,305 A  3/1967  Howe
(Continued)

FOREIGN PATENT DOCUMENTS

CN   103170092   6/2013

OTHER PUBLICATIONS

PCT International Search Report dated Jul. 22, 2016 for PCT Patent Application No. PCT/US2016/027602 filed Apr. 14, 2016.
(Continued)

*Primary Examiner* — Andrew S Lo
*Assistant Examiner* — Gary D Urbiel Goldner
(74) *Attorney, Agent, or Firm* — Ray Quinney & Nebeker

(57) ABSTRACT

A portable stepping device includes at least one spacer and an open platform defining an opening and connected to a first side of the at least one spacer. A trampoline mat is suspended in the opening, and a first foot connected to the open platform. The portable stepping device also includes a closed platform connected to a second side of the at least one spacer, and a second foot connected to the closed platform.

19 Claims, 4 Drawing Sheets

(51) Int. Cl.
*A63B 23/04* (2006.01)
*A63B 5/11* (2006.01)

(52) U.S. Cl.
CPC ........ *A63B 23/0458* (2013.01); *A63B 21/023* (2013.01); *A63B 2210/50* (2013.01); *B32B 2307/50* (2013.01); *B32B 2307/546* (2013.01); *B32B 2307/744* (2013.01)

(58) Field of Classification Search
CPC ........ A63B 23/03508; A63B 23/03516; A63B 23/03525; A63B 23/04; A63B 23/0405; A63B 23/0458; A63B 23/0464; A63B 23/0482; A63B 23/0494; A63B 23/08; A63B 23/10; A63B 26/00; A63B 26/003; A63B 69/0035; A63B 2208/02; A63B 2208/0204; A63B 2208/0209; A63B 2208/0223; A63B 2244/08
See application file for complete search history.

(56) References Cited

U.S. PATENT DOCUMENTS

| | | | | |
|---|---|---|---|---|
| 3,892,403 A * | 7/1975 | Green | ............ | A63B 5/11 182/139 |
| 4,037,834 A * | 7/1977 | Oaks | ............ | A63B 69/0035 482/27 |
| 4,199,136 A * | 4/1980 | Mansfield | ............ | A63B 5/08 482/26 |
| 4,336,933 A * | 6/1982 | Appelbaum | ...... | A63B 69/0035 482/29 |
| 4,489,933 A * | 12/1984 | Fisher | ............ | A63B 5/11 482/147 |
| 4,730,826 A * | 3/1988 | Sudmeier | ............ | A63B 5/11 482/28 |
| 5,277,675 A * | 1/1994 | Shifferaw | ............ | A63B 5/08 482/142 |
| 5,387,166 A * | 2/1995 | Gvoich | ............ | A63B 5/08 482/26 |
| 5,472,390 A | 12/1995 | Faye | | |
| 5,518,476 A | 5/1996 | Mcleon | | |
| 5,533,948 A | 7/1996 | Wilkinson | | |
| 5,562,575 A * | 10/1996 | Gvoich | ............ | A63B 5/08 482/26 |
| 5,637,057 A * | 6/1997 | Collura | ............ | A63B 5/11 482/27 |
| 5,645,510 A | 7/1997 | Wilkinson | | |
| 5,853,352 A * | 12/1998 | Login | ............ | A63B 6/00 482/26 |
| 6,045,489 A * | 4/2000 | Levine | ............ | A63B 22/205 482/112 |
| 6,071,213 A | 6/2000 | Raasch et al. | | |
| 6,132,338 A * | 10/2000 | Shifferaw | ............ | A63B 5/08 482/30 |
| D561,849 S | 2/2008 | Piaget et al. | | |
| 7,335,146 B2 * | 2/2008 | Gerstung | ............ | A63B 69/0035 482/142 |
| 7,431,679 B1 * | 10/2008 | Tageant | ............ | A47C 19/024 482/27 |
| 7,520,840 B2 | 4/2009 | Shifferaw | | |
| 7,722,506 B2 | 5/2010 | Pratson et al. | | |
| 7,833,132 B2 * | 11/2010 | Hylbert | ............ | A63B 5/11 482/27 |
| 8,002,282 B1 * | 8/2011 | Koski | ............ | A63B 63/083 273/317 |
| 8,323,154 B1 | 12/2012 | Bolillo | | |
| D701,653 S * | 3/2014 | Martinez | ............ | D30/118 |
| 2003/0125163 A1 * | 7/2003 | Plante | ............ | A63B 5/11 482/27 |
| 2004/0058781 A1 * | 3/2004 | Plante | ............ | A63B 5/11 482/27 |
| 2005/0148433 A1 | 7/2005 | Wang et al. | | |
| 2006/0272230 A1 | 12/2006 | Elwood | | |
| 2010/0081549 A1 * | 4/2010 | Thompson | ............ | A63B 5/11 482/27 |
| 2012/0244997 A1 | 9/2012 | Thompson | | |
| 2014/0179492 A1 * | 6/2014 | Wilkins | ............ | A63B 71/0619 482/27 |
| 2014/0366268 A1 * | 12/2014 | Revell | ............ | A47C 23/007 5/411 |
| 2016/0144290 A1 * | 5/2016 | Foote | ............ | A63J 5/02 472/76 |

OTHER PUBLICATIONS

English Translation of Taiwan First Office Action and Search Report issued for 105111881 dated Feb. 14, 2017.
English Translation via Orbit.com of the Abstract of CN103170092. Oct. 14, 2015.

* cited by examiner

EXERCISE DEVICE WITH A TRAMPOLINE SURFACE AND A RIGID SURFACE

RELATED APPLICATIONS

This application claims priority to U.S. Patent Application Ser. No. 62/149,366 titled "Exercise Device with a Trampoline Surface and a Rigid Surface" and filed on 17 Apr. 2015, which application is herein incorporated by reference for all that it discloses.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Generally, the human body can adequately supply enough oxygen to meet the body's demands at the intensity levels involved with aerobic exercise. Popular forms of aerobic exercise include running, jogging, swimming, and cycling among others activities. In contrast, anaerobic exercise often involves high intensity exercises over a short duration of time. Popular forms of anaerobic exercise include strength training and short distance running.

Many choose to perform aerobic exercises indoors, such as in a gym or their home. Often, a user uses an aerobic exercise machine to have an aerobic workout indoors. One such type of aerobic exercise machine is an aerobic stepper, which often includes a box that facilitates the upper stepping up and down for a workout. Other popular exercise machines that allow a user to perform aerobic exercises indoors include treadmills, rowing machines, stepper machines, and stationary bikes to name a few.

One type of stepping device is disclosed in U.S. Pat. No. 5,533,948 issued to William T. Wilkinson, et al. In this reference, a combination exercise device includes a trampoline which has a peripheral frame and a resiliently mounted spring member secured to the frame with an upper surface upon which the user may jump. Feet are mounted to the frame for elevating the spring member. The exercise device also includes a step which has a horizontal rigid platform upon which the user may repeatedly step on and off in an aerobic exercise. The trampoline is selectively mounted with respect to the step so that the upper surface of the spring member of the trampoline is selectively disposed above the platform at a sufficient distance to permit the trampoline to be used while mounted over the spring member. In other stages of use the trampoline is removed from the step so that the step may be used in an exercise mode. Alternatively, the trampoline may be of a sufficiently small size that the step and trampoline could be permanently mounted together and both types of exercises could then be selectively performed. Other types of exercise machines are disclosed in U.S. Pat. No. 5,645,510 issued to William T. Wilkinson, et al.; U.S. Pat. No. 7,520,840 issued to Tessema Dosho Shifferaw; and U.S. Pat. No. 8,323,154 issued to Mathieu Anthony Bolillo.

SUMMARY

In the preferred embodiment of the present invention, a portable stepping device includes at least one spacer, an open platform defining an opening and connected to a first side of the at least one spacer, a trampoline mat suspended in the opening, a first foot connected to the open platform, a closed platform connected to a second side of the at least one spacer, and a second foot connected to the closed platform.

In one aspect of the invention, the closed platform includes a rigid sheet of material that spans a width and a length of the portable stepping device.

In one aspect of the invention, the closed platform provides base support to the open platform when the portable stepping device is in the first upright position.

In one aspect of the invention, the open platform provides base support to the closed platform when the portable stepping device is in the second upright position.

In one aspect of the invention, the at least one spacer is 1.5 foot or less.

In one aspect of the invention, the at least one spacer is 9.0 inches or less.

In one aspect of the invention, a portable stepping device includes a first resilient connector that connects the first trampoline mat to the open platform.

In one aspect of the invention, at least one of the first resilient connector and the second resilient portable stepping exhibit a spring force when under tension.

In one aspect of the invention, the open platform is aligned with the closed platform.

In one aspect of the invention, when the portable stepping device is oriented in a first upright orientation, the open platform is superjacent the closed platform and when the portable stepping device is oriented in a second upright orientation, the closed platform is superjacent the open platform.

In one aspect of the invention, at least one of the first foot and the second foot includes a foot including an elastic material.

In one aspect of the invention, the at least one of the first foot set and the second foot set include a foot that is less than 1.0 inches tall.

In one aspect of the invention, the open platform and the closed platform collective form, in part, a cavity.

In one aspect of the invention, a portable stepping device includes at least one spacer, an open platform defining an opening and connected to a first side of the at least one spacer, a trampoline mat suspended in the opening, a first foot connected to the open platform, a closed platform connected to a second side of the at least one spacer, a rigid sheet of material that spans a width and a length of the portable stepping device to form the closed platform, and a second foot connected to the closed platform, wherein the closed platform provides base support to the open platform when the portable stepping device is in the first upright position and the open platform provides base support to the closed platform when the portable stepping device is in the second upright position.

In one aspect of the invention, a first resilient connector that connects the first trampoline mat to the open platform and the first resilient connector exhibits a spring force when under tension.

In one aspect of the invention, when the portable stepping device is oriented in a first upright orientation, the open platform is superjacent the closed platform and when the portable stepping device is oriented in a second upright orientation, the closed platform is superjacent the open platform.

In one aspect of the invention, wherein at least one of the first foot and the second foot includes a foot includes an elastic material.

In one aspect of the invention, wherein the at least one of the first foot and the second foot includes a foot that is less than 1.0 inches tall.

In one aspect of the invention, wherein the open platform and the closed platform collective form, in part, a cavity.

In one aspect of the invention, a portable stepping device includes at least one spacer, an open platform defining an opening and connected to a first side of the at least one spacer, a trampoline mat suspended in the opening, a first resilient connector that connects the first trampoline mat to the open platform and the first resilient connector exhibits a spring force when under tension, a first foot connected to the open platform, a closed platform connected to a second side of the at least one spacer, a rigid sheet of material that spans a width and a length of the portable stepping device to form the closed platform, and a second foot connected to the closed platform, wherein at least one of the first foot and the second foot include a foot comprises an elastic material, is less than 1.0 inches tall, and wherein the closed platform provides base support to the open platform when the portable stepping device is in the first upright position and the open platform provides base support to the closed platform when the portable stepping device is in the second upright position.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

Figure 1:
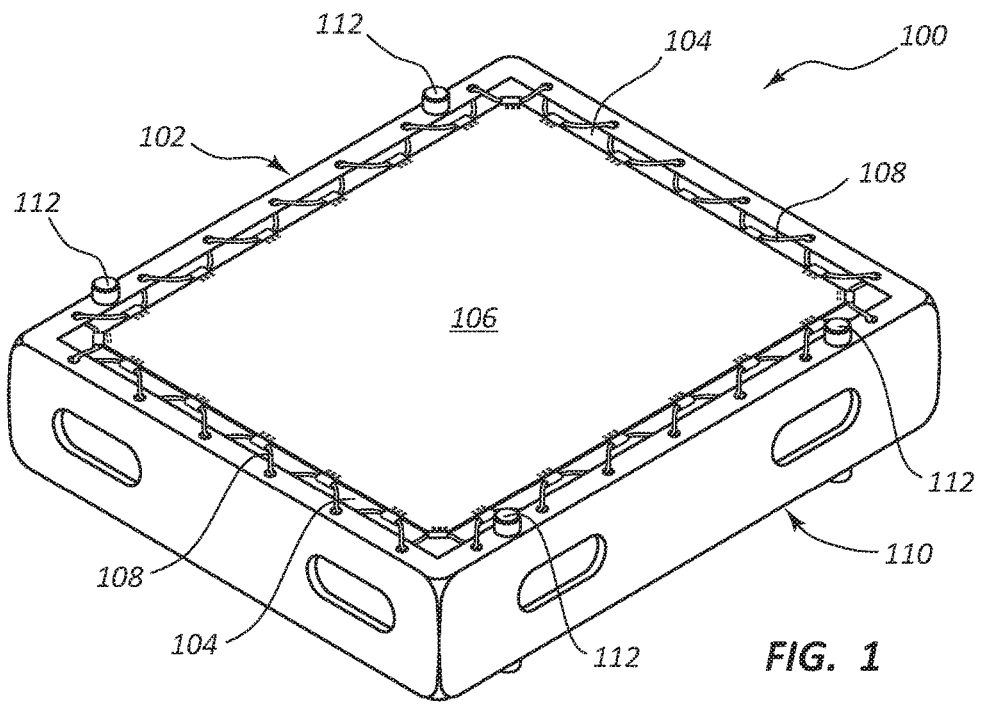
FIG. 1 illustrates a perspective view of an example of a stepper device in accordance with the present disclosure.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. For the purposes of this disclosure, the term "riser height" means the distance from a first step tread 103 to the next contiguous step tread 103 where there are no intermediate step treads 103 therebetween. In some implementations, the sidewall of the frame (e.g., closed platform 110) may include the side of the at least one spacer (e.g., closed platform 110) shown in FIGS. 1 and 4. In another example, the upper surface of the sidewall may include the upper surface of the at least one spacer (e.g., closed platform 110), as shown in FIG. 1. In other words, the upper surface may include the thickness of the at least one spacer, such that the upper surface of the at least one spacer may abut the under surface of the step tread 103. In another example, the lower surface may include the lower surface (e.g., near element 101) of the at least one spacer (e.g., closed platform 110). In other words, the lower surface may include the thickness of the at least one spacer, such that the lower surface of the at least one spacer may abut the under surface of element 101 shown in FIG. 4.

Particularly, with reference to the figures, FIG. 1 depicts an example of an stepping device 100. In this example, the stepping device includes an open platform 102 and a closed platform 110. The open platform 102 defines an opening 104, and a trampoline mat 106 is suspended in the opening 104. The trampoline mat 106 is connected to the open platform 102 with multiple resilient connectors 108. In this example, the resilient connectors 120 include an elastic cord that is spirally connects the respective step tread to the respective mat.

The closed platform 110 comprises a rigid sheet of material to close off the opposing end of the stepping device 100. With the rigid sheet of material in place, the closed platform can support the weight of a user stepping on the stepping device 100 during a stepping workout. The wall of the stepping device 100 or an internal spacer 101 having a first side 103 and a second side 105 of the stepping device 100 carry a load of the user when the user is standing on the closed platform 110 of the stepping device 100. With the stepping device 100 flipped so that the closed platform is underneath, the user can step on the trampoline of the open platform 102. The wall or internal spacer 101 may also support the weight of the user while standing on the open platform 102.

The open platform 102 and the closed platform 110 may each include at least one foot 112. These feet 112 may separate either the closed platform 110 or the open platform 102 from the support surface when the respective platform oriented to face the support surface.

Figure 2:
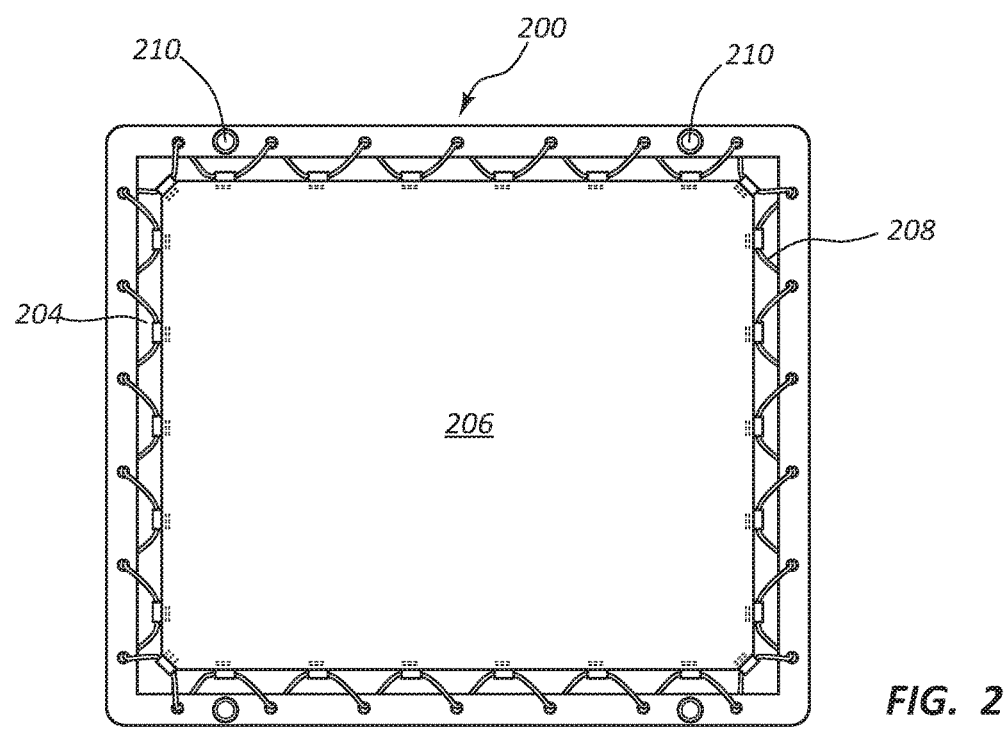
FIG. 2 illustrates a top view of an example of a stepper device in accordance with the present disclosure.

FIG. 2 depicts a top view of an example of a stepping device 100. In this example, the stepping device includes an open platform 102 that defines an opening 104. A trampoline mat 106 is suspended in the opening 104. Resilient connectors 108 connect the trampoline mat 106 to the open platform 102. In this example, the resilient connectors 108 include a plurality of elastic cords that connect the trampoline mat 106 to the open platform 102 in a zigzag pattern.

Figure 3:
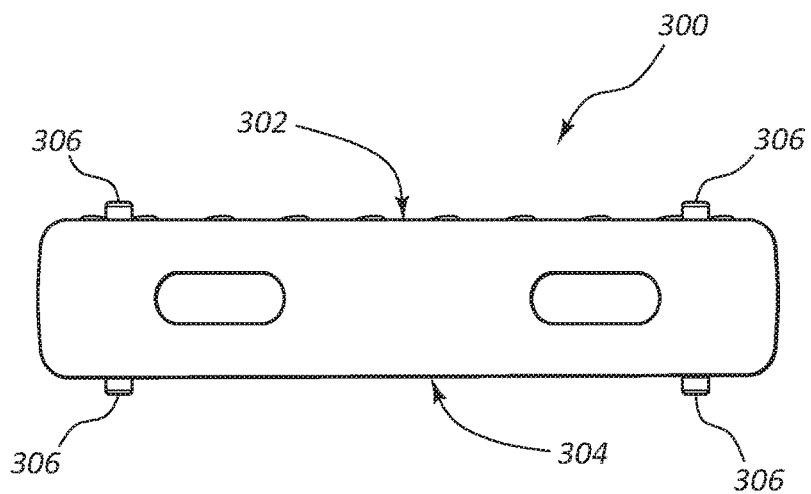
FIG. 3 illustrates a side view of an example of a stepper device in accordance with the present disclosure.

FIG. 3 depicts a side view of an example of a stepping device 100. In this example, the stepping device includes an open platform 102 on one side, and a closed platform 110 on an opposing side. The stepping device 100 can be oriented with the open platform 102 facing upwards and the closed platform 110 facing downwards against a support surface. Also, the stepping device 100 can be oriented with the closed platform 110 facing upwards and the closed platform 110 facing downwards against the support surface. Feet 112 are attached to both the closed platform 110 and the open platform 102. The feet 112 separate the open platform 102 or the closed platform 110 from making contact with the support surface when they face the support surface.

Figure 4:
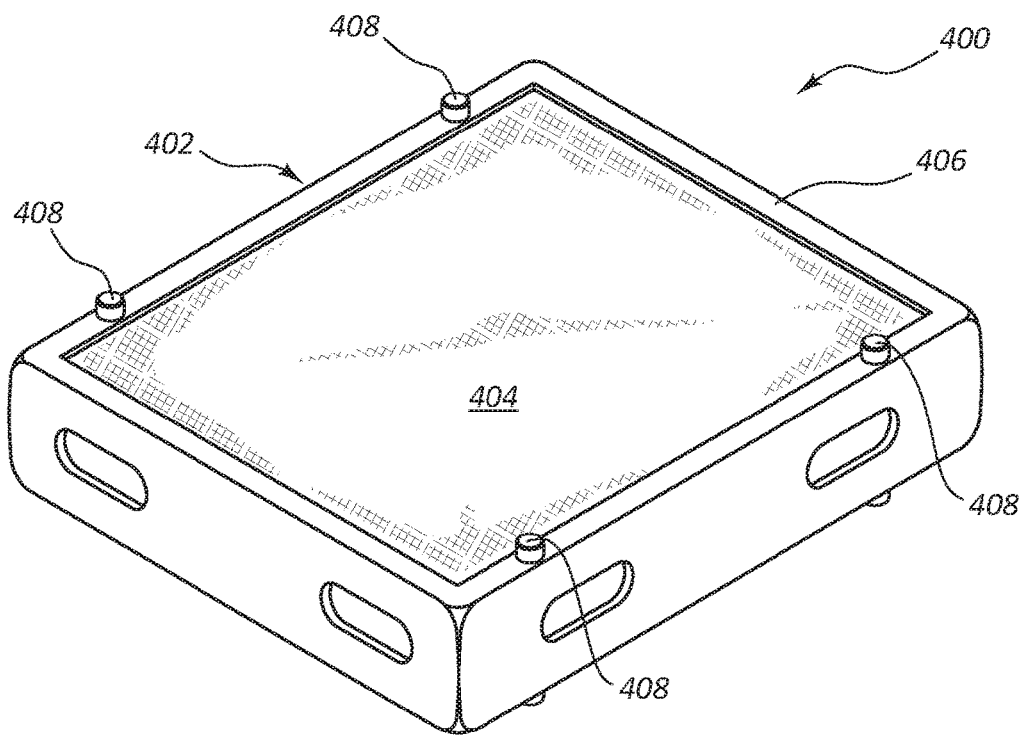
FIG. 4 illustrates a top view of an example of a stepper device in accordance with the present disclosure.

FIG. 4 depicts a top view of an example of a stepping device 100. In this example, the closed platform 110 is facing upwards. The rigid sheet 404 of material spans the width and length of the stepping device 100 to close off the close platform 110. The rigid sheet 404 may be connected to an outer frame 101 of the stepping device 100. Feet 112 are attached to the frame 101 of the closed platform 110.

Figure 5:
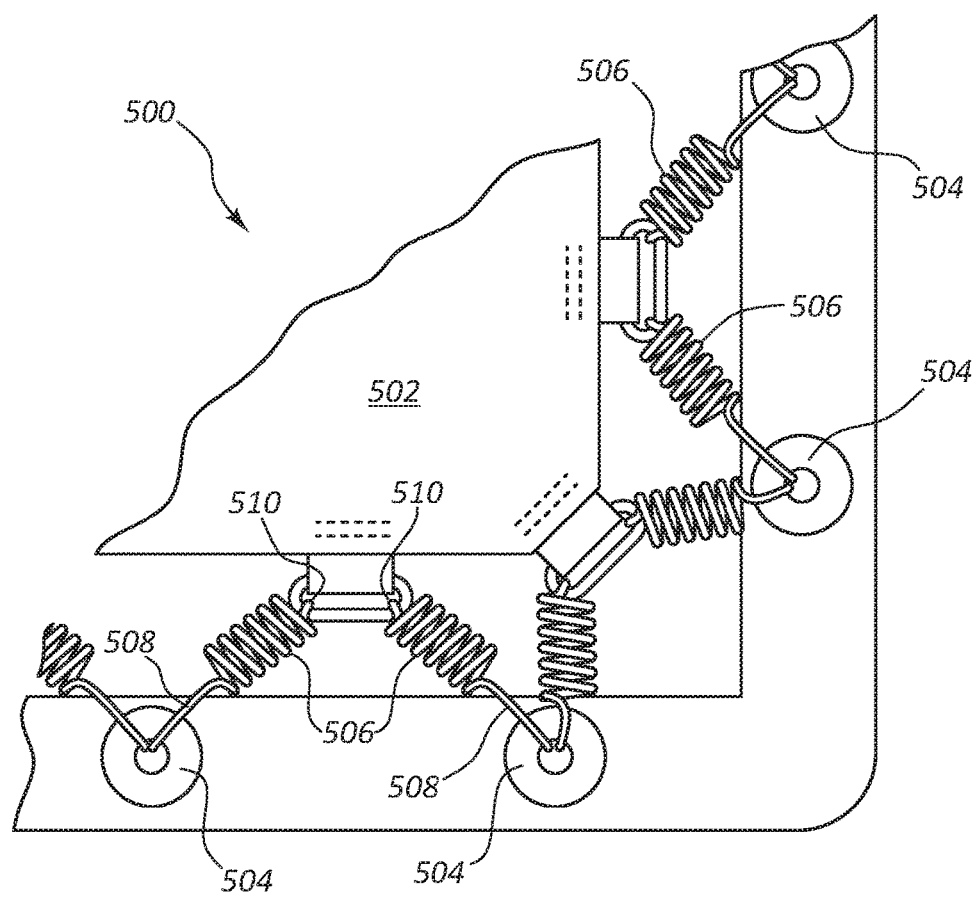
FIG. 5 illustrates a top view of an example of a resilient connector in accordance with the present disclosure.

FIG. 5 depicts another example of a resilient connector 500. In this example, the resilient connector 500 connects a trampoline mat 502 to a step tread 504. The resilient connector 500 includes a spring coil 506 with a first end 508 attached to the trampoline mat 502 and a second end 510 attached to the step tread 504.

Figure 6:
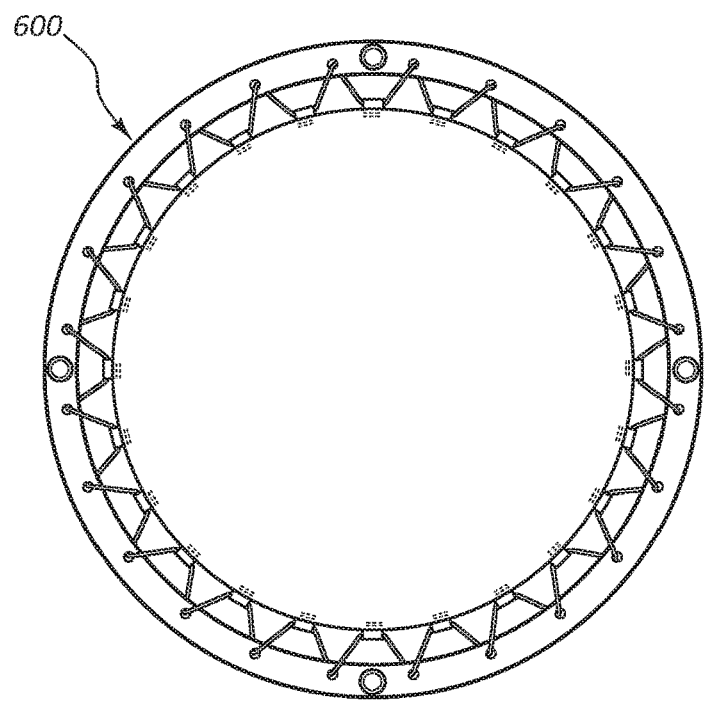
FIG. 6 illustrates a top view of an example of a stepper device in accordance with the present disclosure.
Figure 7:
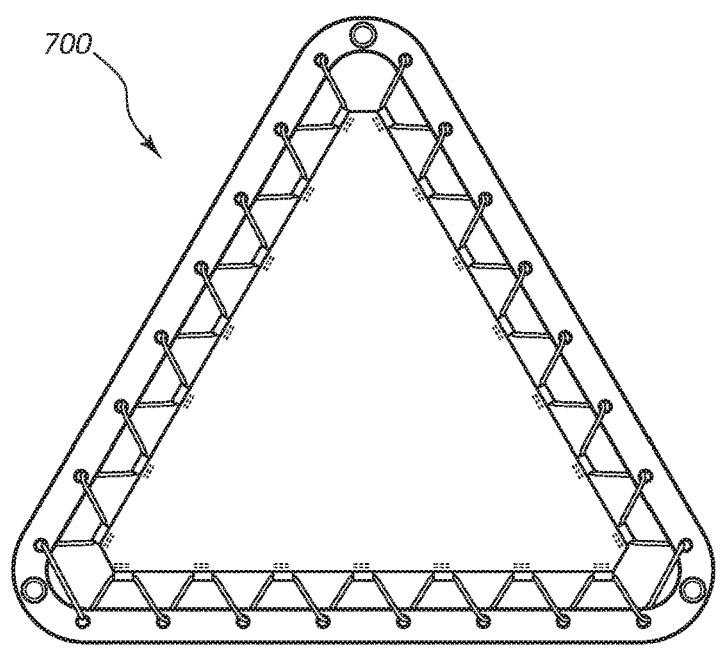
FIG. 7 illustrates a top view of an example of a stepper device in accordance with the present disclosure.

FIGS. 6 and 7 illustrate a top views of example of a stepping devices 600, 700. In the illustrated examples, the platform assumes any number of shapes, including round 600 or triangular 700. As described herein, the stepping device may assume any usable geometry including but in no way limited to, a square, a rectangle, a circle, a semi-circle, a triangle, an octagon, a hexagon, and the like.

INDUSTRIAL APPLICABILITY

In general, the invention disclosed herein may provide a stepping device that can be used as part of an exercise routine. The stepping device include an open platform that defines an opening and a trampoline mat may be suspended in the opening. The trampoline mat may be attached to the open platform through resilient connectors. The open platform may provide the flexible, lower stability surface on which a user may step during the performance of a stepping workout.

The opposing side of the stepping device may include a closed end. The closed platform may provide a rigid surface on which the user can step during a stepping workout. The stepping device may be flipped so that the open platform faces upwards and the closed platform faces downwards. In such an orientation, the open platform is the stepping surface available for the user to step during the workout. Thus, the user may step onto the trampoline mat during the stepping workout. In such an orientation, the closed platform faces the support surface, such the ground or a gym floor. The feet attached to the closed platform elevate the closed platform off of the support surface. The feet may comprise an elastic material that may provide a non-slip grip between the support surface and the stepping device.

When the stepping device is flipped so that the closed platform faces upwards and the open platform faces downwards, the closed platform is the stepping surface available for the user to step during the workout. Thus, the user may step onto the rigid sheet of material during the stepping workout. In such an orientation, the open platform faces the support surface.

A user may use the stepping device as part of the stepping routine by stepping upward onto either the closed platform or open platform depending on the stepping device's orientation. When the user stands on the trampoline mat, the user applies a load to the trampoline mat which causes the trampoline mat to move into a cavity formed in the stepping device. The load is resisted by the resilient connectors which extend under tension until tensile forces of the combined resilient connectors equals the downward load applied by the user's weight. However, even with the resilient members applying the tensile load, the trampoline mat is less stable than a solid platform. As a result, the user has to use stabilizing muscles to keep his or her balances as the user stands or steps on the either the first or second step tread. With conventional stepping devices where the step treads are rigid and solid, the user exerts energy by stepping alone. However, stepping on the open platform, the user has to exert energy as a result of stepping and exert an additional amount of energy to stabilize the user to due to lower stability of the suspended trampoline mats. Thus, the user can burn more energy is a shorter amount of time with the present invention than with a conventional stepping device.

The trampoline mat may be suspended in the open platform with any appropriate type of resilient connector. In some examples, the resilient connect includes a metal spring. In other examples, the resilient connector includes an elastic cord or fabric. The resilient connectors may hold the trampoline mat taut. In some examples, the trampoline mat does not exhibit a high degree of elasticity, but rather rebound effect of the trampoline mat is caused by the stored potential energy in the resilient connectors. Any appropriate type of trampoline mat may be used in accordance with the principles described herein. For example, the trampoline mat may be woven form webbing, strings, a polypropylene material, or other types of materials.

The trampoline mat may be suspended in the opening such that when a user steps onto the trampoline mat, the trampoline mat is pulled downward by the weight of the user. In such a circumstance, a portion of the trampoline mat may be forced into a cavity that is located below the step tread. In some cases, the trampoline mat may be suspended such that the trampoline mat is flush with the step tread in the absence of a load bearing object forcing the trampoline mat downward. In some examples, the trampoline mat is suspended such that the trampoline mat is above the step tread and a portion of the trampoline mat moves into the opening defined by the step tread when the user steps on the trampoline mat.

The stepping device is sized so that an ordinary user can easily step up and down off of the first and second step treads. The height of the stepping device may be between 3.0 inches and 1.5 feet. The height of the stepping device may be defined by the height of the wall or internal spacer that determines the distance the open and closed platforms are apart from one another. In other examples, the height of the stepping device is between 4.0 inches and 1.0 foot. In yet other examples, the height is between 7.0 inches and 9.0 inches. As a comparison, the riser height in stairwells in many residential homes is around 7.0 inches. A riser height above 11.0 inches may be difficult for some users to perform stepping routines. On the other hand, a riser height that is smaller than 3.0 inches may be insufficient to provide the aerobic affect desired by the user during a stepper workout.

A cavity is formed between the open platform and the closed platform. The height of the stepping device is sized to allow the trampoline mat to move downward into the cavity as the user steps onto the trampoline mat. If the trampoline mat moves too far, the user's foot may impact the bottom of the cavity. Thus, the height of the stepping device must be high enough to allow for a cavity with a sufficient depth to avoid the user form impacting the bottom of the cavity during the workout.

Further, the overall width of the stepping device may be any appropriate width. For example, the width may be 36.0 inches or less, 24.0 inches or less, 18.0 inches or less, 15.0 inches or less, 12.0 inches or less, 9.0 inches or less, another appropriate width, or combinations thereof. Further, the length of the stepping device may be any appropriate length. For example, the stepping device may have a length of 36.0 inches or less, 24.0 inches or less, 18.0 inches or less, 15.0 inches or less, 12.0 inches or less, 9.0 inches or less, another appropriate length, or combinations thereof.

The stepping device may include a solid base construction of any appropriate material. For example, the base of the stepping device may be a molded plastic where the components that form the platforms and cavities are integrally formed with each other. In some examples, the stepping device may include parts that can be assembled and disassembled for storage, shipping, or other events.

The rigid sheet may be made of any appropriate type of material. For example, the material may be a plastic, wood, metal, or another type of material. Any appropriate attachment mechanism may be used to attach the rigid sheet to the frame of the stepping device. For example, the rigid sheet may be glued, adhered, fastened, bolted, nailed, wedged, or otherwise attached to the stepping device's frame. In some examples, the closed platform is integrally formed with the frame of the stepping device.

Any appropriate type of feet may be used in accordance with the present invention. In some examples, the feet is made of an elastic material, like rubber, and provides a non-slip grip between the stepping device and the surface on which the stepping device rests. The feet may be compressed when they are in contact with the support surface and a user is stepping on the opposing surface. The feet may be made of plastics, a polymer, rubber, wood, metal, another type of material, or combinations thereof.

The feet may be attached to the stepping device at any appropriate location. For example, the feet may be attached to at least one of the closed platform and the open platform. In some examples, the feet are attached to the frame, the perimeter that hold the trampoline mat, the rigid sheet of the closed platform, another location, or combinations thereof.

What is claimed is:

1. A portable stepping device for exercise, the portable stepping device comprising: a frame comprising an upper surface, a lower surface, and a sidewall, the sidewall being disposed about a perimeter of the frame and joining the upper surface and the lower surface together; wherein the upper surface is an open platform defining an opening; a trampoline mat suspended in the opening and spaced apart from the sidewall to define a gap between an edge of the trampoline mat and the sidewall, wherein the trampoline mat is flush with a step tread of the open platform in an absence of a load bearing object forcing the trampoline mat downward; a first foot connected to the step tread of the open platform; wherein the lower surface is a closed platform comprising a rigid sheet of material that spans a width and a length of the portable stepping device; and a second foot, aligned with the first foot, connected to the closed platform, wherein the first foot extends in a first direction away from the upper surface while the second foot extends in a second direction, opposite the first direction, away from the lower surface.

2. The portable stepping device of claim 1, wherein the closed platform provides base support to the open platform when the portable stepping device is in a first upright position.

3. The portable stepping device of claim 1, wherein the open platform provides base support to the closed platform when the portable stepping device is in a second upright position.

4. The portable stepping device of claim 1, wherein the sidewall has a height of 1.5 feet or less.

5. The portable stepping device of claim 1, wherein the sidewall has a height of 9.0 inches or less.

6. The portable stepping device of claim 1, further comprising a first resilient connector that connects the trampoline mat to the open platform.

7. The portable stepping device of claim 6, further comprising a second resilient connector, wherein at least one of the first resilient connector and the second resilient connector exhibit a spring force when under tension.

8. The portable stepping device of claim 1, wherein the open platform is aligned with the closed platform.

9. The portable stepping device of claim 1, wherein when the portable stepping device is oriented in a first upright orientation, the open platform is superjacent the closed platform and when the portable stepping device is oriented in a second upright orientation, the closed platform is superjacent the open platform.

10. The portable stepping device of claim 1, wherein at least one of the first foot and the second foot comprises an elastic material.

11. The portable stepping device of claim 1, wherein at least one of the first foot and the second foot is less than 1.0 inches tall.

12. The portable stepping device of claim 1, wherein the open platform and the closed platform collectively form, in part, a cavity.

13. A portable stepping device for exercise, the portable stepping device comprising: a frame comprising an upper surface, a lower surface, and a sidewall, the sidewall being disposed about a perimeter of the frame and joining the upper surface and the lower surface together; wherein the upper surface is an open platform defining an opening; a trampoline mat suspended in the opening and spaced apart from the sidewall to define a gap between an edge of the trampoline mat and the sidewall, wherein the trampoline mat is flush with a step tread of the open platform in an absence of a load bearing object forcing the trampoline mat downward; a first foot connected to the step tread of the open platform; wherein the lower surface is a closed platform comprising a rigid sheet of material that spans a width and a length of the portable stepping device; and a second foot, aligned with the first foot, connected to the closed platform, wherein the first foot extends in a first direction away from the upper surface while the second foot extends in a second direction, opposite the first direction, away from the lower surface; wherein the closed platform provides base support to the open platform when the portable stepping device is in a first upright position and the open platform provides base support to the closed platform when the portable stepping device is in a second upright position.

14. The portable stepping device of claim 13, further comprising a first resilient connector that connects the trampoline mat to the open platform, wherein the first resilient connector exhibits a spring force when under tension.

15. The portable stepping device of claim 13, wherein when the portable stepping device is oriented in the first upright position, the open platform is superjacent the closed platform and when the portable stepping device is oriented in the second upright position, the closed platform is superjacent the open platform.

16. The portable stepping device of claim 13, wherein at least one of the first foot and the second foot comprises an elastic material.

17. The portable stepping device of claim 13, wherein at least one of the first foot and the second foot is less than 1.0 inches tall.

18. The portable stepping device of claim 13, wherein the open platform and the closed platform collectively form, in part, a cavity.

19. A portable stepping device for exercise, the portable stepping device comprising: a frame comprising an upper surface, a lower surface, and a sidewall, the sidewall being disposed about a perimeter of the frame and joining the upper surface and the lower surface together; wherein the upper surface is an open platform defining an opening; a trampoline mat suspended in the opening and spaced apart from the sidewall to define a gap between an edge of the trampoline mat and the sidewall, wherein the trampoline mat is flush with a step tread of the open platform in an absence of a load bearing object forcing the trampoline mat downward; a first resilient connector that connects the trampoline mat to the open platform, wherein the first resilient connector exhibits a spring force when under tension; a first foot connected to the open platform; wherein the lower surface is a closed platform comprising a rigid sheet of material that spans a width and a length of the portable stepping device; and a second foot, aligned with the first foot, connected to the closed platform, wherein the first foot extends in a first direction away from the upper surface while the second foot extends in a second direction, opposite the first direction, away from the lower surface; wherein at least one of the first foot and the second foot comprise an elastic material, and is less than 1.0 inches tall; and wherein the closed platform provides base support to the open platform when the portable stepping device is in a first upright position and the open platform provides base support to the closed platform when the portable stepping device is in a second upright position.

\* \* \* \* \*